(12) United States Patent
Martinez et al.

(10) Patent No.: US 10,030,574 B2
(45) Date of Patent: Jul. 24, 2018

(54) METHOD FOR MONITORING THE FUEL INJECTION OF AN INTERNAL COMBUSTION ENGINE WITH DIRECT INJECTION, IN PARTICULAR WITH COMPRESSION IGNITION, AND ENGINE USING SUCH A METHOD

(71) Applicant: IFP Energies nouvelles, Rueil-Malmaison (FR)

(72) Inventors: Lionel Martinez, Maulette (FR); Stéphane Richard, Bazainville (FR); Olivier Laget, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/126,219

(22) PCT Filed: Feb. 5, 2015

(86) PCT No.: PCT/EP2015/052442
§ 371 (c)(1),
(2) Date: Sep. 14, 2016

(87) PCT Pub. No.: WO2015/135700
PCT Pub. Date: Sep. 17, 2015

(65) Prior Publication Data
US 2017/0082013 A1  Mar. 23, 2017

(30) Foreign Application Priority Data

Mar. 14, 2014 (FR) .................................... 14 52119

(51) Int. Cl.
*F02B 23/06* (2006.01)
(52) U.S. Cl.
CPC ...... *F02B 23/0669* (2013.01); *F02B 23/0624* (2013.01); *Y02T 10/125* (2013.01)

(58) Field of Classification Search
CPC .......... F02B 1/12; F02B 9/02; F02B 23/0624; F02B 23/0651; F02B 23/0669;
(Continued)

(56) References Cited

U.S. PATENT DOCUMENTS 5,163,385 A * 11/1992 McMillian .............. F02B 19/14
123/23
6,138,639 A * 10/2000 Hiraya ...................... F01L 3/06
123/295
(Continued)

FOREIGN PATENT DOCUMENTS

EP   2615296 A1   7/2013
FR   2 887 586 A1   12/2006
(Continued)

OTHER PUBLICATIONS

John B. Heywood: "Internal Combustion Engine Fundamentals", Apr. 1, 1988 (Apr. 1, 1998), McGraw-Hill, Singapore, XP002730572, ISBN: 0-07-100499-8 pp. 342-345.
(Continued)

*Primary Examiner* — John Kwon
*Assistant Examiner* — Johnny H Hoang
(74) *Attorney, Agent, or Firm* — Fitch, Even, Tabin & Flannery LLP

(57) ABSTRACT

The present invention relates to a fuel injection method for a compression-ignition direct-injection internal-combustion engine comprising at least a cylinder (10), a cylinder head (12) carrying fuel injectors (14), a piston (16) sliding in the cylinder, a combustion chamber (34) delimited on one side by an upper face (44) of the piston comprising a projection (48) extending in the direction of the cylinder head and located in the center of a concave bowl (46) with at least two mixing zones (Z1, Z2). The injectors project fuel in at least two fuel jet sheets (36, 38) with different sheet angles (A1,
(Continued)

A2). The injection into the combustion chamber with the fuel jets (40) by one sheet (36) is in a radial direction (C1) which forms a non-zero angle (b2) with the radial direction (C2) of fuel jets (42) of the other sheet (38). The oxidizer is admitted into the cylinder in a swirling motion with a swirl number less than or equal to 1.5.

17 Claims, 3 Drawing Sheets

(58) Field of Classification Search
CPC .............. F02B 23/0672; F02B 23/0687; F02B 23/0693; F02B 23/0696; F02M 61/14; F02M 61/1806; F02M 61/1813; F02M 61/192; F02M 45/086; F02F 1/242; F02F 3/26
USPC ....... 123/275, 276, 290, 294, 298, 301, 305, 123/307
See application file for complete search history.

(56) References Cited

U.S. PATENT DOCUMENTS

| | | | | |
|---|---|---|---|---|
| 7,942,126 B2* | 5/2011 | Zoller | ................. | F02B 23/0651 123/298 |
| 9,429,065 B2* | 8/2016 | Zoeller | ................ | F02B 23/0651 |
| 2004/0050982 A1* | 3/2004 | Sprouse | ................ | F23D 11/107 239/596 |
| 2005/0120995 A1* | 6/2005 | Tsujimoto | ........... | F02B 23/0669 123/299 |
| 2013/0036998 A1* | 2/2013 | Cornwell | ............ | F02B 23/0669 123/193.6 |
| 2013/0255622 A1* | 10/2013 | Bandyopadhyay | ........................... | F02M 61/1813 123/294 |
| 2015/0101565 A1* | 4/2015 | Gutzer | ................ | F02D 41/3094 123/299 |
| 2017/0051657 A1* | 2/2017 | Martinez | ............. | F02B 23/0669 |
| 2017/0096978 A1* | 4/2017 | Martinez | ............. | F02B 23/0672 |
| 2017/0114730 A1* | 4/2017 | Laget | .................. | F02D 19/0689 |

FOREIGN PATENT DOCUMENTS

| | | |
|---|---|---|
| FR | 3012522 A1 | 5/2015 |
| WO | 2013/016713 A2 | 1/2013 |

OTHER PUBLICATIONS

International Search Report for PCT/EP2015/052442 dated Apr. 20, 2015; English translation submitted herewith (7 Pages).

* cited by examiner

METHOD FOR MONITORING THE FUEL INJECTION OF AN INTERNAL COMBUSTION ENGINE WITH DIRECT INJECTION, IN PARTICULAR WITH COMPRESSION IGNITION, AND ENGINE USING SUCH A METHOD

BACKGROUND OF THE INVENTION

Field of the Invention

The present invention relates to a method of controlling the fuel injection of a direct-injection internal-combustion engine, and notably to a compression-ignition engine, using the same. The invention more particularly relates to a method for an engine usable in the air transport or road sector, or in the field of stationary equipments such as engine generators.

Description of the Prior Art

This type of engine generally comprises at least a cylinder, a piston provided with a projection located in a concave bowl which slides in the cylinder in a reciprocating rectilinear motion, an intake for an oxidizer, a burnt gas exhaust, a combustion chamber and fuel injectors injection means for injecting a fuel into the combustion chamber.

As it is generally known, upon design of an engine, the performance, pollutant emission and mechanical strength constraints of the combustion chamber are increasingly high while the devices for meeting them are quite the opposite.

Thus, performance increase generally leads to an increase in emissions and to higher mechanical stresses.

It is therefore necessary to overcome these stresses to guarantee limited pollutant emissions and satisfactory mechanical strength over the entire operating range of the engine, and in particular at very high load. In particular for pollutant emissions, using all of the oxidizer present in the combustion chamber, for example an oxidizer comprising air at ambient pressure, supercharged air or a mixture of air (supercharged or not) and of recirculated burnt gas, is of great importance.

Indeed, the fuel mixture (oxidizer/fuel) in the combustion chamber needs to be as homogeneous as possible.

In practice, the fuel remains confined in the bowl and it cannot mix with the oxidizer contained notably in the compression area, which is the volume located in the upper part of the combustion chamber delimited by the cylinder wall and the face of the cylinder head opposite the piston.

This involves the drawback of creating high richness areas in the combustion chamber, generating a high production of soots, carbon oxide (CO) and unburnt hydrocarbons (HC) upon combustion of this fuel mixture.

Furthermore, the thermal load is focused on the re-entrant part of the piston, which is the bowl neck or diameter restriction that marks the transition between the piston bowl and the upper zone encompassing the compression area, which may be limiting in terms of mechanical strength at very high loads.

To overcome these drawbacks, and as better described in French patent application No. 13/60,426 filed by the applicant, an internal-combustion engine comprising fuel injectors with jets having at least two sheet angles and a piston comprising a bowl provided with a projection with two combustion zone volumes and internal aerodynamics substantially improving the combustion quality is provided.

This allows a larger amount of oxidizer to be used compared to conventional engines, and to distribute the thermal load over a larger surface area of the combustion chamber.

In this type of engines, mixing of the injected fuel and of the oxidizer, such as air at ambient pressure or supercharged air or a mixture of air (supercharged or not) and of recirculated exhaust gas, admitted to the combustion chamber occurs in two stages.

First, upon fuel injection, the oxidizer located on the periphery of the fuel jet is carried along by the jet. Small-scale mixing due to the turbulence generated by this entrainment occurs then.

In order to improve this fuel/oxidizer mixing, a swirling motion of the oxidizer, referred to as swirl, which provides large-scale "stirring" of the unmixed fuel, is used in a second stage. This swirl can be seen as a rotating motion of the oxidizer about an axis substantially parallel to or merged with that of the combustion chamber. This swirl can be obtained by using a particular oxidizer intake, such as a specific intake line geometry.

In this configuration, it should however be noted that, while the small-scale mixing performed in the gaseous spray is very quick, the large-scale mixing associated with the swirling motion occurs more slowly.

The performances of the engine, the fuel consumption thereof or the discharge of pollutants such as soots, carbon monoxide or unburnt hydrocarbons greatly depend on the capacity for quick mixing of the fuel with the oxidizer admitted.

Optimization of the injection system and of the swirl level is therefore generally performed in order to optimize the engine performances.

One solution uses a relatively high swirl number Ns, of the order of 2 to 3, this number being equal to the ratio of the rotation speed of the swirling motion of the oxidizer to that of the crankshaft.

One drawback of this solution is that, for some engine operating points, in particular when the fuel injection pressure is not high enough, or when a large amount of fuel is injected, the fuel jets can be excessively diverted circumferentially, thus causing interaction or even superposition between the various jets.

This phenomenon can significantly increase soot and unburnt hydrocarbon emissions while degrading the combustion efficiency, and therefore the power and the consumption.

SUMMARY OF THE INVENTION

The present invention overcomes the aforementioned drawbacks by a method which obtains better mixing of the oxidizer (gaseous fluid) while enabling to use a fuel injection system with at least two sheet angles and a piston whose profile allows the combustion chamber to comprise at least two combustion zones.

The invention therefore relates to a fuel injection method for a compression-ignition direct-injection internal-combustion engine comprising at least a cylinder, a cylinder head carrying fuel injectors, a piston sliding in the cylinder, a combustion chamber delimited on one side by the upper face of the piston comprising a projection extending in the direction of the cylinder head and arranged in the center of a concave bowl with at least two mixing zones. The injectors project fuel in at least two fuel jet sheets with different sheet angles. A lower sheet having jet axis C1 for zone Z1 and an upper sheet of jet axis C2 for zone Z2 is used which injects fuel into the combustion chamber. The fuel jets of one of the sheets injects fuel in a radial direction which forms a non-zero angle b2 with the radial direction C2 of the fuel jets of the other sheet. The oxidizer is admitted in a swirling motion with a swirl number less than or equal to 1.5.

The method can inject the fuel jets with an angular offset, between two neighboring jets belonging to different sheets, substantially equal to the half angle between two jets of the same sheet.

The method can inject the fuel in a number n of jets related to the swirl number Ns by the correlation: $-4 \cdot Ns + 16 \leq n \leq -4 \cdot Ns + 18$.

The method can inject the fuel in at least two fuel jet sheets positioned axially one above the other, with each having a different sheet angle.

The method can inject the fuel with a different fuel flow rate in each sheet.

The invention also relates to a compression-ignition direct-injection internal-combustion engine comprising at least a cylinder, a cylinder head carrying fuel injectors, a piston sliding in the cylinder, a combustion chamber delimited on one side by the upper face of the piston comprising a projection extending in the direction of the cylinder head and located in the center of a concave bowl. The method injects the fuel in at least two fuel jet sheets with different sheet angles. A lower jet sheet has jet axis C1 and an upper sheet has jet axis C2, comprising fuel injectors for injecting the fuel jets of one of the sheets in a radial direction which forms a non-zero angle with the radial direction of the fuel jets of the other sheet and means for admits the oxidizer in a swirling motion with a swirl number less than or equal to 1.5.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
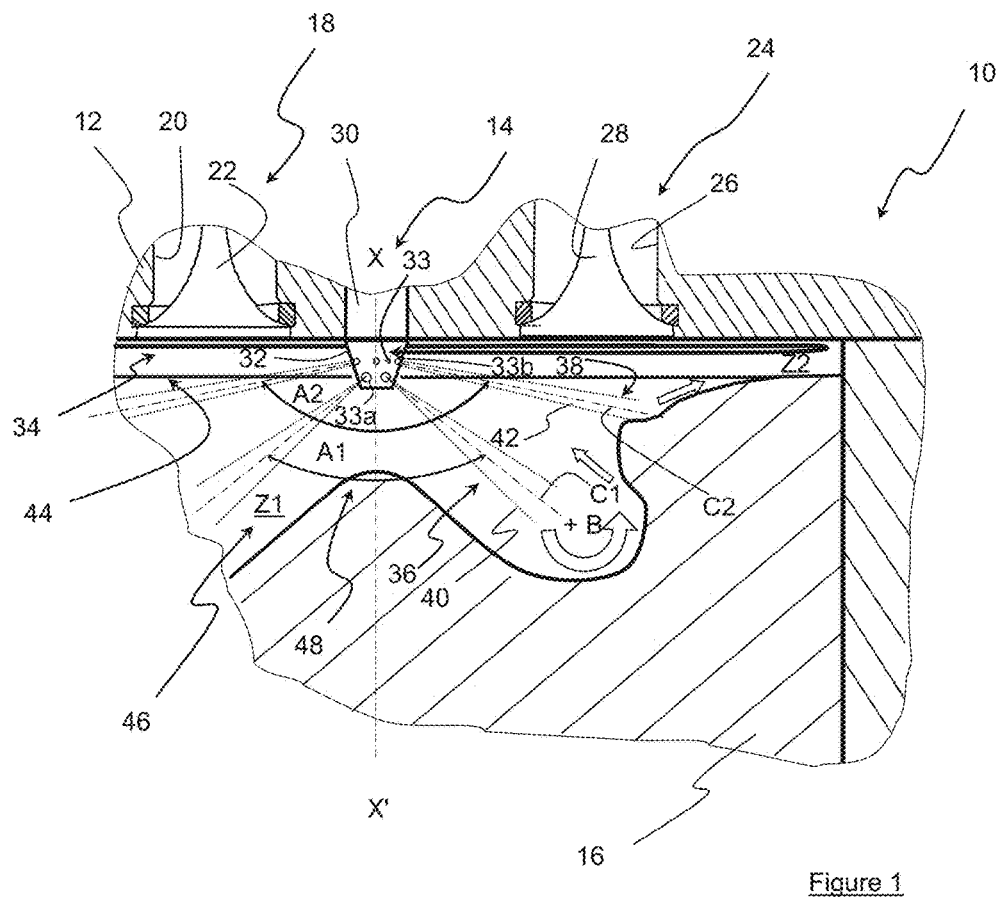
FIG. 1 shows an internal-combustion engine according to the invention.

With reference to FIG. 1, a compression-ignition direct-injection internal-combustion engine comprises at least a cylinder 10, a cylinder head 12 closing the cylinder in the upper part, fuel injectors 14 carried by the cylinder head and a piston 16 of axis XX' sliding in the cylinder with a reciprocating rectilinear motion.

Fuel is understood to be a liquid fuel such as diesel fuel, kerosene or any other fuel with the physicochemical characteristics allowing operation of an engine of compression ignition type including a direct injection system for this fuel.

This engine also comprises a burnt gas exhaust 18 with at least one exhaust pipe 20 whose opening can be controlled by any mechanism such as an exhaust valve 22 for example, and an intake 24 for an oxidizer with at least one intake pipe 26 whose opening can be controlled by any mechanism such as an intake valve 28 for example.

The intake 28 is designed for admitting the oxidizer with a predetermined swirl ratio. The intake can therefore comprise at least one throttling mechanism and the engine can comprise at least one control for actuating the throttle to obtain the predetermined swirl ratio. The intake can also comprise a specific intake pipe geometry.

The injection means comprises at least one fuel injector 30, preferably arranged along axis XX' of the piston, whose nozzle 32 comprises a multiplicity of orifices 33 through which the fuel is sprayed and projected in the direction of combustion chamber 34 of the engine.

The injectors projected the fuel as at least two fuel jet sheets, which are two sheets 36 and 38 of fuel jets 40 and 42, which, in the example shown, have a general axis merged with that of piston 16 while being axially positioned one above the other.

More precisely, sheet 36 that is closer to piston 16, is referred to as the "lower sheet" in the description hereafter, while sheet 38, that is further away from the piston, is referred to as the "upper sheet".

As can be seen in FIG. 1, these two sheets form sheet angles A1 and A2 different from one another. A sheet angle is understood to be the top angle formed by the cone originating from the injector, whose imaginary peripheral wall passes through all the axes C1 or C2 of fuel jets 40 or 42.

Advantageously, sheet angle A1 of the lower sheet is at most equal to 130°, preferably ranges between 105° and 130°, while sheet angle A2 of the upper sheet is at most equal to 180°, and preferably ranges between 155° and 180°.

Figure 2:
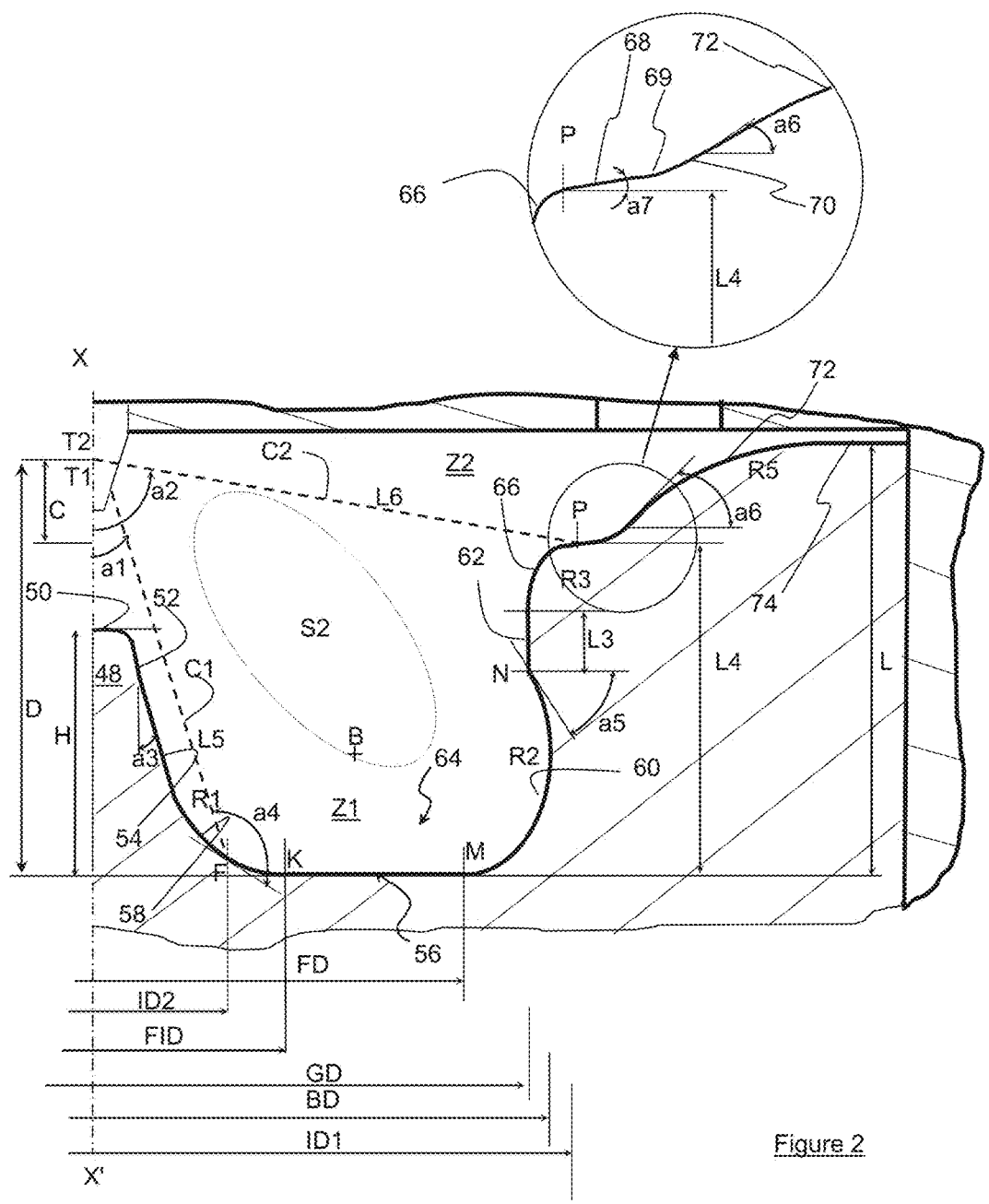
FIG. 2 is a large-scale partial view of a half section of the piston bowl profile of the engine of FIG. 1.

For simplification reasons, in the rest of the description, angle a1 corresponds to A1/2 and angle a2 corresponds to A2/2 (see FIG. 2).

Preferably, the difference between angle A1 and angle A2 is greater than or equal to 25°. This allows limitation of fuel jet overlap between the two sheets and therefore formation of pollutants such as soots.

Of course, it is possible for the injectors to not to be arranged along axis XX', but in this case the general axis of the fuel jet sheets from the fuel injector is at least substantially parallel to this axis XX'.

Similarly, it is possible for each sheet to be carried by a distinct injector (single-sheet injector) with dedicated targeting in distinct zones of the combustion chamber.

Combustion chamber 34 is delimited by the inner face of cylinder head 12 opposite the piston, the circular inner wall of cylinder 10 and upper face 44 of piston 16.

This upper face of the piston comprises a concave bowl 46, whose axis is here merged with that of the cylinder, whose concavity is directed towards the cylinder head and which houses a projection 48 arranged substantially in the center of the bowl, which rises towards cylinder head 12, while being preferably coaxial with the axis of the fuel sheets from injector 30.

Of course, it is possible for the axis of the bowl to be coaxial with that of the cylinder, but the main thing is the layout according to which the axis of the fuel jet sheet, the axis of the projection and the axis of the bowl are preferably merged.

Furthermore, with reference to FIG. 2, projection 48, which generally is truncated in shape, comprises a preferably rounded top 50 extended, while moving symmetrically away from axis XX' towards the outside of piston 16, by a substantially rectilinear inclined surface 52 extended by an inclined flank 54 down to a bottom 56 of the bowl.

Of course, without departing from the scope of the invention, inclined surface 52 can be nonexistent (zero length) and inclined flank 54 then connects the top of the teat to the bottom of the bowl.

In the example of FIG. 2, the bottom of this bowl is rounded, with a concave rounded surface 58 in form of an arc of a circle with radius R1, referred to as inner rounded surface, connected to the bottom of inclined flank 54 and another concave rounded surface 60 in form of an arc of a circle with radius R2, referred to as outer rounded surface, connected at one end to the lower end of the inner rounded surface at a point M and at the other end thereof to a lateral wall 62, substantially vertical here, at a point N.

The two rounded surfaces 58 and 60 thus delimit the lower part of a toroidal volume, here a torus of substantially cylindrical section 64 and of center B whose purpose is described in the rest of the description.

Lateral wall 62 is extended, still while moving away from axis XX, by a convex rounded surface 66 in form of an arc of a circle with radius R3, referred to as re-entrant, leading to an inclined plane 68 linked to a concave inflection surface 69 connected to a substantially plane surface 70. This plane surface is continued by an outer convex surface 72 to form of an arc of a circle with radius R5 that leads to a plane surface 74 extending up to the vicinity of the cylinder wall.

The combustion chamber thus comprises two distinct zones Z1 and Z2 where mixing of the oxidizer they contain (air, supercharged or not, or mixture of air and recirculated burnt gas) with the fuel coming from the injector, as well as combustion of the fuel mixture thus formed, occurs.

Zone Z1, which is delimited by projection 48, torus 64 at the bowl bottom, wall 62 and convex rounded surface 66, forms the lower zone of the combustion chamber associated with lower sheet 36 of fuel jets of axis C1. Zone Z2, delimited by inclined plane 68, concave surface 69, substantially plane surface 70, convex surface 72, plane surface 74, the peripheral inner wall of the cylinder and cylinder head 12, forms the upper zone of this chamber associated with upper sheet 38 of fuel jets of axis C2.

In this configuration, the bowl comprises, for a piston position close to the top dead center:

a bowl bottom outside diameter FD with a radius considered between axis XX' and point M, the lowest point of the bowl, that is at the intersection between the surfaces of radius R1 and R2;

a bowl opening diameter BD with a radius considered in the vicinity of the bowl bottom and corresponding to a distance taken between axis XX' and the furthest point of outer concave surface 60;

a neck diameter GD having a radius corresponding to the distance between axis XX' and vertical wall 62 delimiting the outlet section of the bowl;

an upper injection diameter ID1 with a radius corresponding to the distance between axis XX' and the start of inflection surface 69 at point P between inclined plane 68 and concave surface 66 by delimiting a length L6 of jets 38 between the origin T2 of axis C2 of the jets on the axis of the injector nozzle and point P, meeting the formula ID1/sin(a2), a developed length of the diametral half section Cb of the bowl, including of the length from the intersection of the projection top with axis XX' to the cylinder wall, a projection height H between the bowl bottom at point M and the top of the projection, a bowl height L between the bowl bottom at point M and plane surface 74, a junction height L3 corresponding to the extent of lateral wall 62 considered between the end of outer rounded surface 60 at point N and the start of outer rounded surface 66, a height L4 considered between point P and point M, an angle of inclination a3 with respect to a vertical for inclined flank 54, an angle of inclination a4 formed by principal axis C1 of the fuel jets of lower sheet 36 impacting the torus with the tangent to impact point F by delimiting a length L5 of jets 40 between origin T1 of axis C1 of the jets on the axis of the injector nozzle and point F. This length L5 meets formula ID2/sin(a1), with ID2 corresponding to a lower injection diameter with a radius that corresponds to the distance between axis XX' and point F, an angle of inclination a5 considered at the tangency of outer rounded surface 60 with lateral wall 62 at point N, an angle of inclination a6 with respect to the horizontal and the tangent to substantially plane wall 70, an angle of inclination a7 with respect to the horizontal and inclined plane 68 at intersection point P.

All these parameters are appreciated for a position of piston 16 in the vicinity of the top dead center that corresponds to a distance D considered between point M and the origin T2 of axis C2 of jets 42.

More precisely, this distance D is equal to the sum of height L4 and height C, height C corresponding to the axial height between origin T2 and point P. This height corresponds to formula ID1/tan(a2).

Thus, the dimension and angle parameters of this bowl meet at least one of the following conditions:

angle a4 is greater than 80°, which amounts to passing over half the fuel jet between center B of torus 65 and the projection, and more precisely the lower part at point M, and thus generates an aerodynamic upward motion in the torus towards the top of the cylinder, angle a5 must be positive and less than 90°. Preferably, it has to be of the order of 30° to 40° to direct fuel jets 40 of lower sheet 36 towards oxidizer volume S1 in order to use the oxidizer of this zone while limiting upflow of this fuel towards upper sheet 38, oxidizer volume S1 between fuel jets 40 of the lower sheet is minimized, still in order to optimize the use of oxidizer in the chamber, the position of the top of projection 48 is as close as possible to nozzle 32 of injector 30 to limit the volume of oxidizer under the injector that will not be impacted by the fuel jets, which again amounts to minimizing volume S1. Thus, ratio H/L is greater than
40% and preferably greater than 60%, angle a3 is substantially equal to or greater than angle a1 of the lower sheet (−10°<a3−a1<10°). Thus, the general axis of the lower sheet jets is tangential to flank 54 of the projection. Fuel jets 40 of lower sheet 36 can thus interact with rounded surface 58 by vaporizing totally prior to impacting the piston, oxidizer volume S2 between the two sheets is non-zero since the interaction between the sheets is detrimental to the pollutants. Volume S2 however needs to be minimized. Therefore, junction length L3 between the torus and re-entrant 66 (convex rounded surface of radius R3) has to be such that L3/(2*length of R2)<1 or (L3/length of R2<2) in order to ensure that oxidizer volume S2 available between the upper 38 and lower 36 sheets is low in relation to the fuel volume generated by the jets of the lower sheet, second combustion zone Z2 arranged in the upper part of the piston that starts from re-entrant 66 is intended for fuel jets 42 of upper sheet 38, the combustion volume of zone Z2 is at least equal to one tenth of the total volume of the bowl, the area referred to as the compression area is formed by inclined plane 68, concave surface 69, plane surface 70, convex surface 72 and plane surface 74. Angle a6 ranges between 10° and 75°, which allows to burst fuel jets 42 so as to create an aerodynamic motion above the piston and additionally to use the oxidizer in the squish area. This aerodynamics allows better fuel/oxidizer mixing above the piston, notably during expansion, thus promoting oxidation of the burnt gas, in order to promote the distribution of the fuel from jets 42 in the compression area, a guiding surface 68 is provided between re-entrant 66 and surface 70. This guiding surface can be rounded in the continuation of the re-entrant or substantially plane. The purpose of this guiding surface is to concentrate fuel jets 42 and to guide them towards convex surface 72. Thus, this guiding surface has an angle a7 at intersection point P whose difference with respect to sheet angle a2 is less than 45°, the position of inflection surface 69 is such that distances L5 and L6 are approximately of the same order (0.5<L5/L6<2). Thus, advantageously, the fuel jets will impact substantially at the same time the piston in the torus and the inflection zone respectively, diameter ID1 must be such that ID1/GD>1 and ID1<(GD+(Cb−GD)*2/3). This allows fuel jets 42 to optimize the aerodynamics above the piston.

Furthermore, ratio BD/L is less than 6, preferably less than 4, ratio R2/R1 is less than 1, preferably less than 0.6, ratio FD/BD is less than 1, ratio Cb/BD is less than 2 so as to maintain complete vaporization of the fuel and to prevent wetting of the cylinder wall, ratio GD/BD ranges between 0.7 and 1 for the torus aerodynamics and upflow of the fuel jets, ratio H/L is greater than 40%, preferably greater than 60% so as to minimize the oxidizer volume between the injector nozzle and the teat, ratio L5/L6 ranges between 0.5 and 2 for the impact of the two sheets at the same time, A1 ranges between 40° and 130° with a1=A1/2, A2 ranges between 130° and 180° with a2=A2/2, a3 is substantially equal to a1, a4 is greater than 80°, a5 ranges between 0° and 90°, preferably substantially between 30° and 40°, a6 ranges between 15° and 75°, a7−a2 is less than 45°, ratio ID1/GD is greater than 1, ID1 is less than (GD+(Cb−GD)*2/3).

Thus, with bowl parametrization, the fuel jets of lower sheet 36 directly target torus 64 and they do not directly impact re-entrant 66.

Therefore, combustion of the lower fuel/oxidizer mixture occurs essentially in the torus volume, whereas combustion of the upper fuel/oxidizer mixture occurs essentially in the compression area and above the piston.

Furthermore, the interaction of the upper sheet jets with the lower sheet jets is limited, which allows the fuel/oxidizer mixture to be homogenized while meeting mechanical strength constraints at high load.

Figure 3:
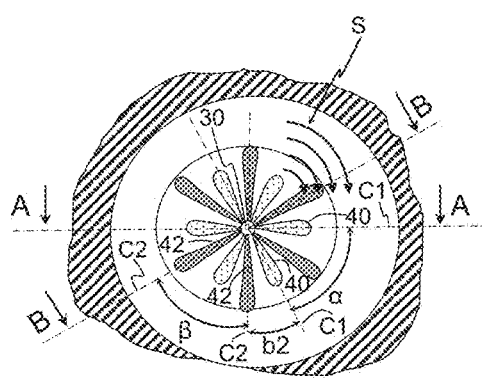
FIG. 3 is a local cross-sectional view of the bowl during the initial fuel injection phase.

FIG. 3 in association with FIG. 1 illustrates an example of fuel injection into combustion chamber 34.

As already mentioned, injector 30 carries, in the region of nozzle 32 thereof, injection orifices 33 from which the fuel jets extend radially (see FIG. 1). These orifices have at least two series of radial fuel injection orifices 33a and 33b arranged substantially parallel to one another. The orifices are positioned circumferentially on the nozzle and the series are arranged one above the other. One of the series comprises orifices 33a through which the fuel is injected by forming lower jet sheet 36 of axis C1 for mixing zone Z1. The other series comprises orifices 33b for injection of the fuel forming upper jet sheet 38 of axis C2 for mixing zone Z2.

In this configuration, radial injection of the fuel jets occurs in a radial direction from the injector to the walls of the combustion chamber corresponding to axes C1 and C2.

Of course, without departing from the scope of the invention, the diameters of orifices 33a and 33b can be different. By way of example, the diameter of orifices 33a can be larger than the diameter of orifices 33b. Since the injection pressure is identical in the region of the injector nozzle, this results in two fuel jet sheets with different flow rates.

Similarly, the number of orifices between the lower sheet and the upper sheet can be different and correlated as a function of the swirl number as explained below.

Finally, the number n of orifices that can be provided for the whole of the two sheets can be related to the swirl number Ns by the correlation: −4·Ns+16≤n≤−4·Ns+18.

The limiting case of a number of orifices where n=18 corresponds to a zero swirl number. Indeed, the angle formed by the fuel jets being generally close to 20°, in the absence of swirl, the number of jets has to be less than or equal to 18 so as to avoid direct interaction between the jets. Furthermore, in this limiting case, the interaction of the jets of the lower sheet with the bowl bottom causing widening of the head of the fuel jets, upon upflow thereof towards the compression area, they may interact with the jets of the upper sheet and disturb the mixing process.

This generally results in a soot production increase and combustion efficiency decrease. The number of jets is therefore preferably slightly reduced to 17 or even 16 ensure that no interaction is possible between the jets.

When the swirl is not zero, simulations carried out by the applicant with an identical number of orifices on each sheet allowed to show that the number of jets should not exceed 14 when the swirl number is 1, otherwise the production of soot might increase substantially.

In general terms, the goal being to minimize the role of the swirling motion in the mixing process and to perform mixing by multiplying the number of jets, it is recommended not to go below 10 injection ports, i.e. 5 ports per sheet, and beyond a swirl number of 1.5.

FIG. 3 illustrates an injector comprising 12 injection orifices with 6 orifices 33a and 6 orifices 33b, jets 40 of sheet 36 are evenly distributed circumferentially while being separated each by an angle α substantially equal to 60° with respect to their axis C1 and jets 42 of sheet 38 are also evenly distributed circumferentially while being separated each by an angle β substantially equal to 60° with respect to their axis C2.

Furthermore, orifices 33a of the lower sheet and orifices 33b of the upper sheet must not be positioned one above the other; the axes of two neighbouring jets belonging to different sheets must have an angular offset, denoted by b2, which is here substantially equal to the half angle between two jets of the same sheet.

This allows prevent interaction between the two sheets when the fuel from the lower sheet leaves the bowl zone to pass into the compression area.

It is thus possible to use a large and equal number of ports for each sheet with a low swirl number, ideally below 1.5, to mix the fuel and the oxidizer as quickly as possible, predominantly during the injection process.

Mixing is then mainly achieved through entrainment of the gaseous oxidizer by the fuel jets, the contribution related to the swirling motion remaining low and being kept only to complete the mixing process with large-scale stirring upon expansion of the piston.

Thus, during fuel injection, the oxidizer is admitted to combustion chamber 34 with a swirling motion S and a swirl number of 1.5.

There are 12 fuel jets evenly distributed among the two sheets (6 jets for the lower sheet and 6 jets for the upper sheet) and angle b2 is 30°.

Figure 3A:
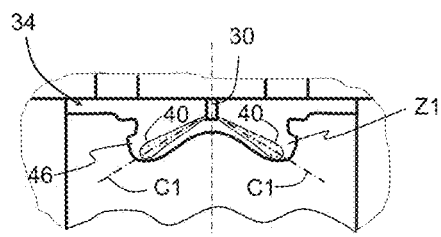
FIGS. 3A and 3B are sectional views along lines AA and BB of FIG. 3.

Fuel jets 40 of the lower sheet are sent towards the bottom of bowl 46 in zone Z1 (FIG. 3A) while jets 42 of the upper sheet are oriented towards the top of the bowl in zone Z2.

Figure 4:
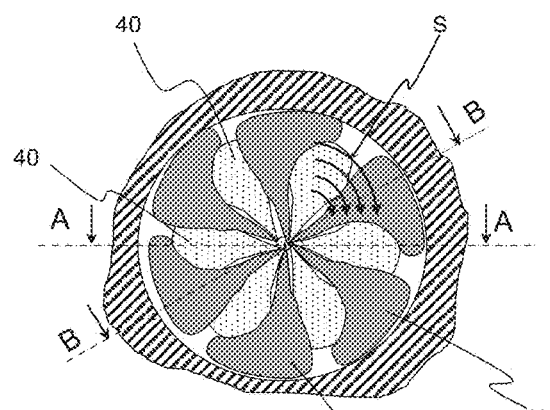
FIG. 4 is another local cross-sectional view of the bowl during the final fuel injection phase.
Figure 4A:
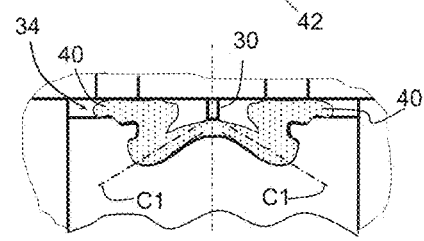
FIGS. 4A and 4B are sectional views along lines AA and BB of FIG. 4.
Figure 3B:
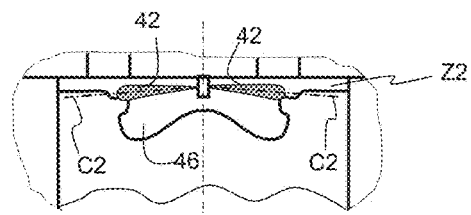
Figure 4B:
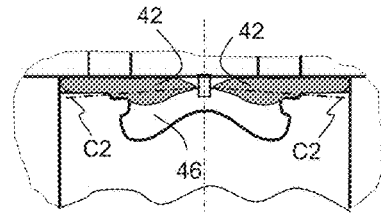

During the final injection phase, it can be observed that, despite swirl S, the fuel jets of the two sheets do not overlap (FIG. 4) and that the combustion has used almost all of the oxidizer present in zone Z1 (FIG. 4A) and in zone Z2 (FIG. 4B).

The invention claimed is:

1. A fuel injection method for a compression-ignition internal-combustion engine including at least an intake, a cylinder, a cylinder head carrying fuel injectors, a piston sliding in the cylinder, a combustion chamber delimited on one side by an upper face including a projection extending in a direction of the cylinder head and located in a center of a concave bowl with at least upper and lower fuel mixing zones comprising:
projecting fuel as at least upper and lower fuel jet sheets with the sheets having different sheet angles, different fuel jet axes with the upper fuel jet sheet projecting fuel into the upper fuel mixing zone of the combustion chamber and the lower fuel jet sheet projecting fuel into the lower fuel mixing zone;
injecting at least two fuel jets in one of the upper and lower fuel jet sheets that form a non-zero angular offset with fuel jets of another of the upper and lower fuel jet sheets; and
admitting an oxidizer inside of the combustion chamber through the intake of the engine which initiates a swirling motion having a swirl number equal to or less than 1.5.

2. A method as claimed in claim 1, comprising:
injecting the fuel jets with the angular offset, between two neighbouring fuel jets belonging to different sheets, which is substantially equal to half an angular offset between two jets of the same sheet.

3. A method as claimed in claim 1, comprising:
injecting a number n of fuel jets related to the swirl number Ns by a relation $-4Ns+16 \leq n \leq -4Ns+18$.

4. A method as claimed in claim 2, comprising:
injecting the fuel with a number n of fuel jets related to the swirl number Ns by a relation $-4Ns+16 \leq n \leq -4Ns+18$.

5. A method as claimed in claim 1, comprising:
injecting fuel in at least two fuel jets sheets positioned axially one above the other.

6. A method as claimed in claim 2, comprising:
injecting fuel in at least two fuel jets sheets positioned axially one above the other.

7. A method as claimed in claim 3, comprising:
injecting fuel in at least two fuel jets sheets positioned axially one above the other.

8. A method as claimed in claim 4, comprising:
injecting fuel in at least two fuel jets sheets positioned axially one above the other.

9. A method as claimed in claim 1, comprising:
projecting the fuel in the sheets with a different fuel flow rate in each sheet.

10. A method as claimed in claim 2, comprising:
projecting the fuel in the sheets with a different fuel flow rate in each sheet.

11. A method as claimed in claim 3, comprising:
projecting the fuel in the sheets with a different fuel flow rate in each sheet.

12. A method as claimed in claim 4, comprising:
projecting the fuel in the sheets with a different fuel flow rate in each sheet.

13. A method as claimed in claim 5, comprising:
projecting the fuel in the sheets with a different fuel flow rate in each sheet.

14. A method as claimed in claim 6, comprising:
projecting the fuel in the sheets with a different fuel flow rate in each sheet.

15. A method as claimed in claim 7, comprising:
projecting the fuel in the sheets with a different fuel flow rate in each sheet.

16. A method as claimed in claim 8, comprising:
projecting the fuel in the sheets with a different fuel flow rate in each sheet.

17. A compression-ignition internal-combustion engine comprising:
at least an intake, a cylinder, a cylinder head carrying fuel injectors, a piston sliding in the cylinder, a combustion chamber delimited on one side by an upper face including a projection extending in a direction of the cylinder head and located in a center of a concave bowl with at least upper and lower fuel mixing zones; wherein the fuel injectors project fuel as at least upper and lower fuel jet sheets with the sheets having different sheet angles and different fuel jet axes with the upper fuel jet sheet projecting fuel into the upper fuel mixing zone of the combustion chamber and the lower fuel jet sheet projecting fuel into the lower fuel mixing zone; and
injecting at least two fuel jets into one of the upper and lower fuel jet sheets which form a non-zero angular offset with fuel jets of another of the upper and lower fuel jet sheets; and the intake admits an oxidizer into the combustion chamber which initiates a swirling motion to the fuel and oxidizer having a swirl number equal to or less than 1.5.

\* \* \* \* \*